US012459279B2

(12) United States Patent
Ogura

(10) Patent No.: US 12,459,279 B2
(45) Date of Patent: Nov. 4, 2025

(54) POWER SUPPLY APPARATUS, IMAGE FORMING APPARATUS, AND POWER SUPPLY CONTROL METHOD

(71) Applicant: CANON KABUSHIKI KAISHA, Tokyo (JP)

(72) Inventor: Ryota Ogura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 18/230,239

(22) Filed: Aug. 4, 2023

(65) Prior Publication Data

US 2024/0051319 A1 Feb. 15, 2024

(30) Foreign Application Priority Data

Aug. 9, 2022 (JP) ................................ 2022-127323

(51) Int. Cl.

*B41J 2/045* (2006.01)
*B41J 23/02* (2006.01)
*B41J 29/38* (2006.01)

(52) U.S. Cl.

CPC ............... *B41J 29/38* (2013.01); *B41J 23/02* (2013.01)

(58) Field of Classification Search

CPC ... B41J 2/04548; B41J 2/0455; B41J 2/14072
See application file for complete search history.

(56) References Cited

U.S. PATENT DOCUMENTS

2012/0049632 A1* 3/2012 Sato ........................ B41J 2/0451 307/80
2015/0314592 A1* 11/2015 Tsubotani .............. B41J 2/0458 347/17
2015/0314593 A1* 11/2015 Mori ...................... B41J 2/0457 347/5
2016/0347097 A1 12/2016 Ogasawara et al.

FOREIGN PATENT DOCUMENTS

JP S63-77757 A 4/1988
JP 2016-224561 A 12/2016

* cited by examiner

*Primary Examiner* — Scott A Richmond
(74) *Attorney, Agent, or Firm* — Venable LLP

(57) ABSTRACT

A power supply apparatus comprises: a first power supply line; a second power supply line; a connection unit connecting the first and second power supply line and capable of operating in either a first operation mode in which power transmission between the first and second power supply lines is possible or a second operation mode in which power transmission is not possible; an electric discharge unit connected to the second power supply line and capable of operating in either a third operation mode in which a voltage of the second power supply line is dropped or a fourth operation mode in which the voltage is not dropped; a voltage monitoring unit to monitor the voltage of the second power supply line; and a control unit to control operation of the connection unit and the electric discharge unit.

19 Claims, 11 Drawing Sheets

POWER SUPPLY APPARATUS, IMAGE FORMING APPARATUS, AND POWER SUPPLY CONTROL METHOD

BACKGROUND OF THE INVENTION

Field of the Invention

The present invention relates to a power supply apparatus including a connection circuit and an electric discharge circuit, an image forming apparatus, and a power supply control method.

Description of the Related Art

Conventionally, thermal-head-type inkjet printing apparatuses have a power supply unit that supplies power to heaters that are mounted on a print head, which is an ink discharge unit, and a control circuit that controls the heaters. Japanese Patent Laid-Open No. 2016-224561 discloses a configuration in which an electric relay circuit is connected between a power supply unit and a print head and power is supplied. Japanese Patent Laid-Open No. 63-77757 discloses a configuration in which, in a condition in which the supply voltage is unstable due to a power failure or the like, in order to prevent a print head from being damaged due to excessive power being supplied to the print head, a power supply for driving the print head is discharged based on a reset signal.

In such power supply apparatuses for supplying power to an external apparatus, there are cases where unintended power is supplied to the external apparatus due to malfunctioning of circuit elements, such as an electric relay circuit and an electric discharge circuit. In such cases, there is a problem that a malfunction of a power supply apparatus may cause a malfunction of an external apparatus to which power is supplied by the power supply apparatus.

SUMMARY OF THE INVENTION

The present invention has been made in view of the above-described problems, and a purpose thereof is to, when a power supply apparatus malfunctions, prevent inappropriate power from being supplied to an external apparatus to which power is supplied by the power supply apparatus.

A power supply apparatus according to the present invention for solving the above-described problems comprises: a first power supply line to which power is supplied from a power supply unit; a second power supply line connected to an external apparatus; a connection unit connecting the first power supply line and the second power supply line and configured to be capable of operating in either a first operation mode in which power transmission from the first power supply line to the second power supply line is possible or a second operation mode in which power transmission is not possible; an electric discharge unit connected to the second power supply line and configured to be capable of operating in either a third operation mode in which a voltage of the second power supply line is dropped or a fourth operation mode in which the voltage is not dropped; a voltage monitoring unit configured to monitor the voltage of the second power supply line; and a control unit configured to control operation of the connection unit and the electric discharge unit, wherein the control unit decides whether to supply power to the second power supply line based on a control state of the connection unit and the electric discharge unit and the voltage of the second power supply line monitored by the voltage monitoring unit.

It is possible to, when a power supply apparatus malfunctions, prevent inappropriate power from being supplied to an external apparatus to which power is supplied by the power supply apparatus.

Further features of the present invention will become apparent from the following description of exemplary embodiments (with reference to the attached drawings).

DESCRIPTION OF THE EMBODIMENTS

Figure 1:
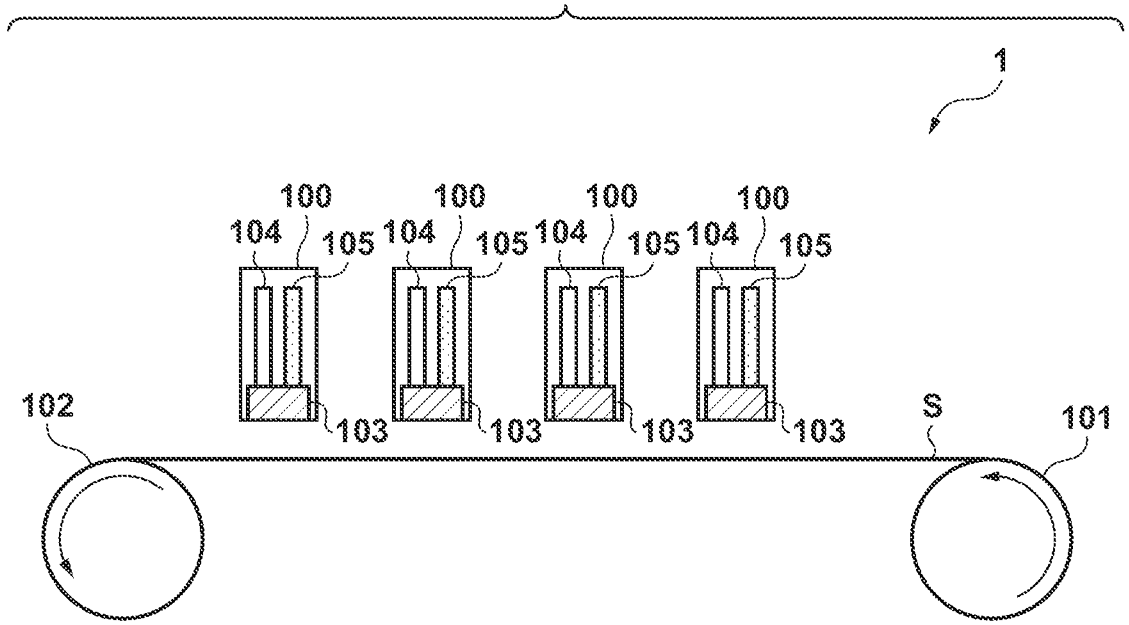
FIG. 1 is a configuration diagram of a printing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

FIG. 1 is a configuration diagram of a printing apparatus 1 according to the present embodiment. The printing apparatus 1 is an example of an image forming apparatus and includes a first conveyance unit 101, a second conveyance unit 102, and one or more print heads 100.

The first conveyance unit 101 and the second conveyance unit 102 are examples of a conveyance apparatus for conveying a sheet S, which is a sheet-like printing medium, and the sheet S is conveyed by the second conveyance unit 102 winding the sheet S after it has been conveyed by the first conveyance unit 101. The sheet S is, for example, roll-shaped paper (rolled paper), cloth, a plastic film, or the like. An image is formed on the conveyed sheet S, which is a printing medium, by the print heads 100 performing print processing from above onto the sheet S.

Regarding the print heads 100, a plurality of print heads are arranged along a conveyance direction following a conveyance path. In the present embodiment, the print heads include four line-type print heads, which correspond to four colors, black (Bk), yellow (Y), magenta (M), and cyan (C). The number of colors and the number of print heads 100 are not limited to four. The respective colors of ink are each supplied to the print head 100 from an ink tank (not illustrated) via an ink tube. The print head 100 includes a replacement head 103 in which heaters, nozzles, and the like are provided, a control board 104, and a power supply board 105, which are electrically connected to each other.

A plurality of nozzles and corresponding heaters are provided in the print head 100, and ink is discharged by an electric signal from a print control unit, which will be described later. The replacement head 103 can be attached to and detached from the control board 104, the power supply board 105, and the ink tank (not illustrated) and can be replaced. The replacement head 103 may be a head unit that cannot be replaced.

Figure 2:
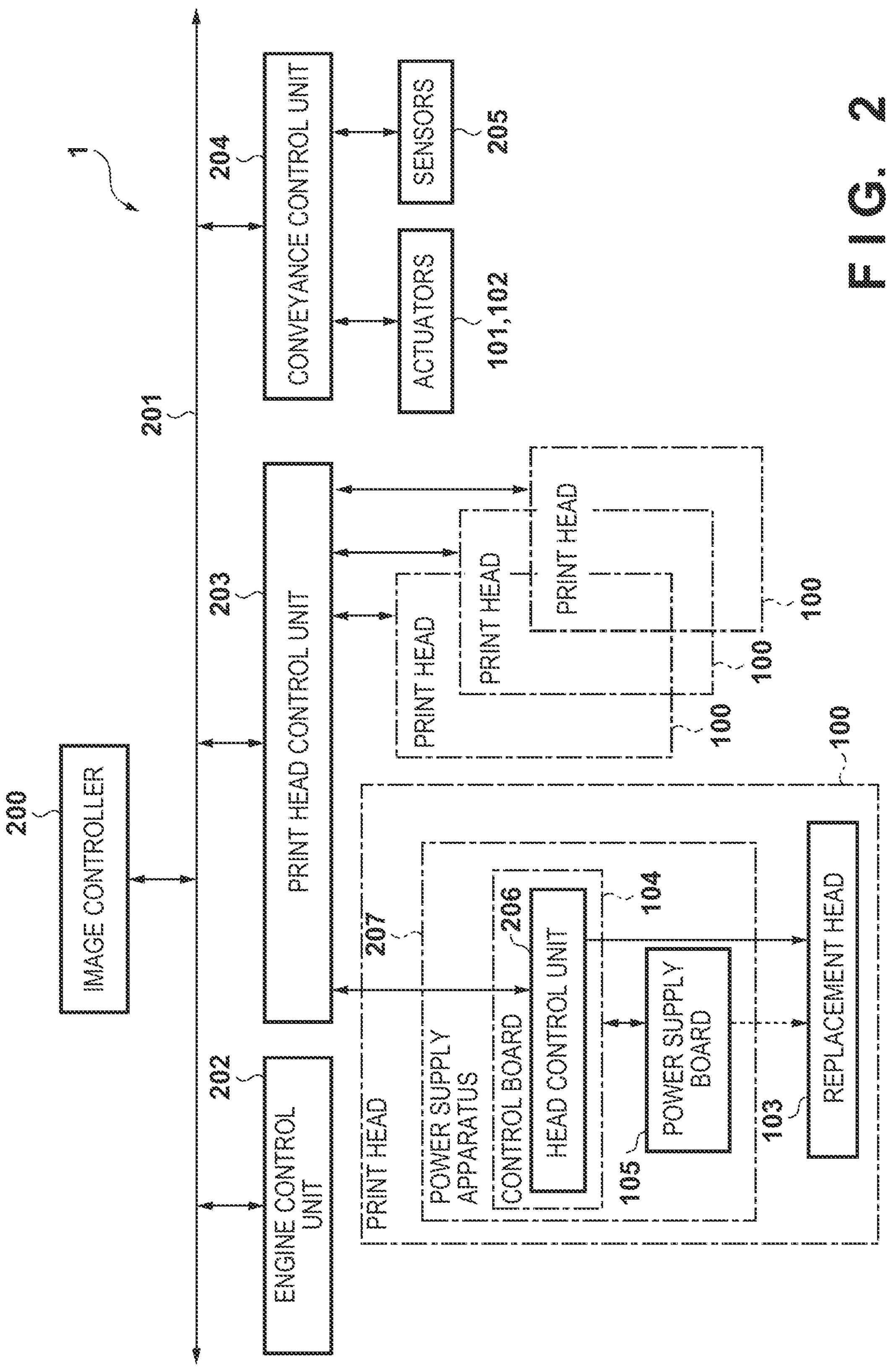
FIG. 2 is a block diagram of the printing apparatus according to the first embodiment.

FIG. 2 is a control block diagram of the printing apparatus 1. An image controller 200 performs image processing for converting data, which is a source of an image to be printed, to data to be handled by a print head control unit 203. The data on which image processing has been performed by the image controller 200 is transmitted to the print head control unit 203 via a communication interface (I/F) 201. The print head 100 is arranged in the printing apparatus 1 for each color as described above and is controlled by the print head control unit 203.

An engine control unit 202 controls the entire engine in the printing apparatus 1. A conveyance control unit 204 controls actuators included in the first conveyance unit 101 and the second conveyance unit 102 illustrated in FIG. 1. In addition, a printing medium conveyance timing may be controlled based on data obtained from a sensor 205.

The print head control unit 203 generates a control signal for controlling the print heads 100 based on image data obtained from the image controller 200. In addition, the print head control unit 203, for example, adjusts discharge timings between the plurality of print heads 100.

The print head 100 includes a power supply apparatus 207 and the replacement head 103, and the power supply apparatus 207 includes the control board 104 and the power supply board 105, which have been illustrated in FIG. 1. The power supply apparatus 207 is an example of a power supply apparatus according to the present embodiment, and the replacement head 103 is an example of an external apparatus to which power is supplied by the power supply apparatus.

The control board 104 includes a replacement head control unit 206 and controls the power supply board and the replacement head 103 based on a control signal received from the print head control unit 203. The replacement head control unit 206 converts data that has been decompressed in the print head control unit 203 into data that corresponds to an array of nozzles of the head and transmits the data to the replacement head 103.

Figure 3:
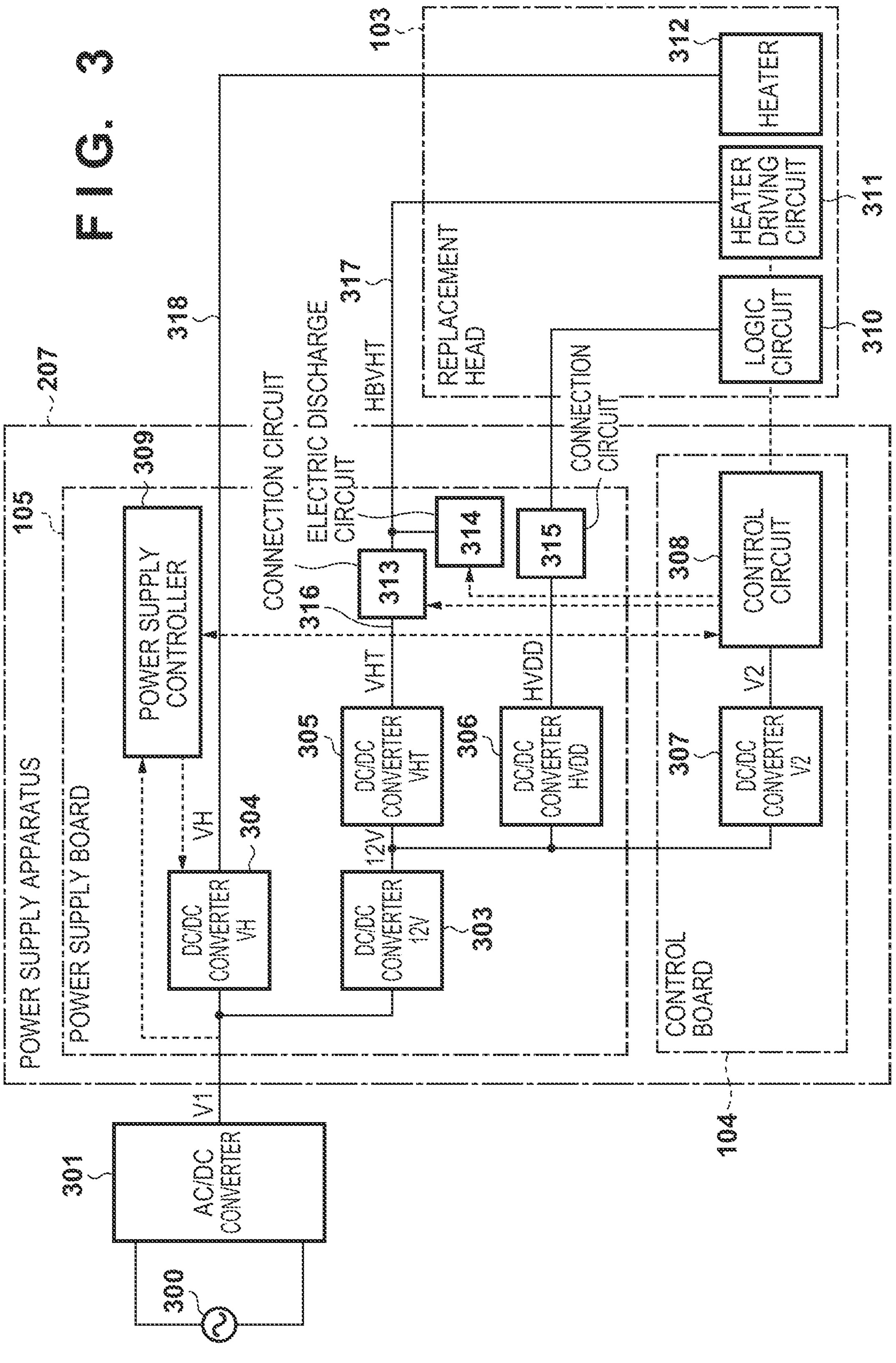
FIG. 3 is a block diagram of a print head according to the first embodiment.

FIG. 3 is a block diagram for explaining a configuration of a power supply system for supplying power to the replacement head 103 by controlling a power supply circuit on the power supply board 105. In FIG. 3, solid lines that connect the blocks indicate power supply lines that are used for transmitting and receiving power, and dotted lines indicate signal lines that are used for transmitting and receiving control signals.

An AC power supply 300 and an AC/DC converter 301 are arranged in the printing apparatus 1. The AC power supply 300 supplies, via the AC/DC converter 301, voltage V1 DC power to DC/DC converters 303 and 304 of the power supply board 105 provided in each print head 100 of the printing apparatus 1.

<Power Supply Board>

The DC/DC converter 303 provides voltage 12 VDC power to DC/DC converters 305 and 306 of the power supply board 105 and to a DC/DC converter 307 of the control board 104.

The DC/DC converter 305 generates, from the power that has been supplied from the DC/DC converter 303, voltage VHT DC power to be supplied to a heater driving circuit 311 of the replacement head 103. The voltage VHT DC power outputted from the DC/DC converter 305 is supplied to a connection circuit 313 via a power supply line 316 (first power supply line). The power supplied to the connection circuit 313 is converted into a voltage HBVHT and is supplied to the heater driving circuit 311 via a power supply line 317 (second power supply line).

The DC/DC converter 306 generates, from the power that has been supplied from the DC/DC converter 303, voltage HVDD DC power to be supplied to a logic circuit 310 of the replacement head 103. Regarding the voltage HVDD DC power outputted from the DC/DC converter 306, the voltage is converted by a connection circuit 315 and the power is inputted into the logic circuit 310 of the replacement head 103.

The DC/DC converter 304 provides the voltage VH DC power to a heater 312 of the replacement head 103 of the print head 100 via a power supply line 318 (third power supply line).

A power supply controller 309 can control whether the DC/DC converter 304 is on/off and change the power supply voltage VH outputted by the DC/DC converter 304. In addition, by monitoring the power supply voltage V1, which is inputted from the AC/DC converter 301 to the DC/DC converter 304, the power supply controller 309 can detect a power failure and the turning off of the power supply.

Regarding the connection circuits 313 and 315, it is possible to adopt electric relay elements, which include solid state electric relays and mechanical electric relay switches. The connection circuits 313 and 315 are controlled by a control circuit 308, and the connection operation is switched on/off according to an ink discharge operation sequence. In the following description, a mode in which the connection circuit 313 makes a connection so as to transmit the power supplied from the DC/DC converter 305 to the heater driving circuit 311 is set as a first operation mode (on state), and a mode in which no power is transmitted is set as a second operation mode (off state). Similarly, a mode in which the connection circuit 315 allows transmission of power supplied from the DC/DC converter 306 to the logic circuit 310 is set as a first operation mode (on state), and a mode in which power is not transmitted is set as a second operation mode (off state). The connection circuits 313 and 315 can control the timings at which the power outputted from the DC/DC converters 305 and 306 is supplied to the heater driving circuit 311 and the logic circuit 310. For example, when the printing apparatus 1 is started, the control circuit 308 performs control so as to start supplying power to the logic circuit 310, the heater driving circuit 311, and the heater 312 in that order.

An electric discharge circuit 314, which is controlled by the control circuit 308, is connected to the second power supply line 317, which is connected from the connection circuit 313 to the heater driving circuit 311. The operation of the electric discharge circuit 314 will be described later with reference to FIG. 4.

<Control Board>

The DC/DC converter 307 generates voltage V2 DC power to be supplied to the control circuit 308 of the control board 104. In addition, the DC/DC converter 307 may supply power whose voltage is different from V2 depending on the devices that are used in the control circuit 308 or the other devices that are mounted on the control board 104. For example, power of a different voltage may be supplied by a logic power supply, an analog power supply, and the like.

The control circuit 308 is a control unit, such as a microcontroller, and realizes control of the power supply apparatus 207 including the control processing of FIG. 6, which will be described later, by executing a program stored in a memory (not illustrated). The control circuit 308 generates a timing signal that allows determination of ink discharge of the print head 100 according to image data (not illustrated) that has been inputted from outside the print head 100 and inputs a control signal to the logic circuit 310.

The description will be given assuming that the voltage of each power supply line is V1>VH>VHT>HVDD V2.

<Replacement Head>

For a plurality of ink nozzles (not illustrated) mounted on the print head 100, a plurality of heaters 312 and heater driving circuits 311 are provided; however, in FIG. 3, one of each is illustrated. The logic circuit 310 selects a heater to drive from a plurality of heaters 312 based on a control signal from the control circuit 308. The heater driving circuit 311 receives an on/off signal from the logic circuit 310 and drives a double-diffused MOSFET (DMOS) of the heater 312. The heater driving circuit 311 also converts the voltage level of a signal of the logic circuit 310, which has been generated using the voltage HVDD as a reference, to the voltage VHT for driving the DMOS. Thus, the heater 312 of the replacement head 103 generates heat, and ink is discharged.

The operation of the electric discharge circuit 314 will be described with reference to FIG. 4. In order to cause a large amount of current to flow to the heater 312, a capacitor is connected, on the replacement head 103 side, to the power supply line 318 for supplying the voltage VH power, and low impedance is realized. Meanwhile, the larger the capacitance of the capacitor, the slower the discharge of the charge accumulated in the capacitor. Therefore, when, at time TO, the operation of the AC/DC converter 301 for supplying the voltage V1 stops due to a power failure or the like, the drop of voltage is slower for the voltage of the power supply line 318 for supplying the voltage VH than that of the power supply lines for supplying the voltages HVDD and HBVHT. In the present embodiment, the power supply controller 309 monitors the voltage of the power outputted by the AC/DC converter 301 and, by detecting that the output voltage has dropped below a threshold, can determine a power failure.

Here, in a period toff in which the voltage of the power supply line for supplying the voltage HVDD is smaller than a minimum voltage Voff, which is necessary for the operation of the logic circuit 310, the operation of the logic circuit 310 becomes unstable, and the output of the logic circuit 310 may become unstable. Therefore, there are cases where, in the period toff, the logic circuit 310 outputs a signal that turns on the heater driving circuit 311. Here, if the voltage of the second power supply line 317 for supplying power to the heater driving circuit 311 remains as the dashed line, when a signal for turning on the heater driving circuit 311 is outputted from the logic circuit 310, there are cases where the heater driving circuit 311 unintendedly drives the heater 312. As a result, ink is discharged from the replacement head 103, resulting in a possibility that the print head 100 may malfunction.

Therefore, the power supply apparatus 207 according to the present embodiment includes the electric discharge circuit 314 for discharging charge accumulated in the power supply line 317 for supplying power to the heater driving circuit 311 before the voltage supplied to the logic circuit 310 falls below Voff.

The electric discharge circuit 314 can operate in a third operation mode (on state) in which it operates so as to reduce the voltage of the power supply line 317 and a fourth operation mode (off state) in which it operates so as not to reduce the voltage of the power supply line 317. At the time of power failure, by operating in the third operation mode and reducing the voltage of the heater driving circuit 311 in the period toff in which the output of the logic circuit 310 becomes unstable, the electric discharge circuit 314 can prevent the heater 312 from being driven. It is possible to prevent the operation of the heater 312 by discharging the power supply line 318 for supplying the voltage VH rather than the power supply line 317 for supplying the voltage HBVHT. However, the amount of charge accumulated in the power supply line 318 for supplying the voltage VH is greater than that of the power supply line 317 for supplying the voltage VHT; thus, when connecting an electric discharge circuit to the power supply line 318, the capacitance of the circuit device necessary for electric discharge needs to be increased. Therefore, in the present embodiment, the voltage of the power supply line 317 for supplying the voltage HBVHT power for which the capacitance of the circuit device necessary for electric discharge is small is reduced.

Figure 5:
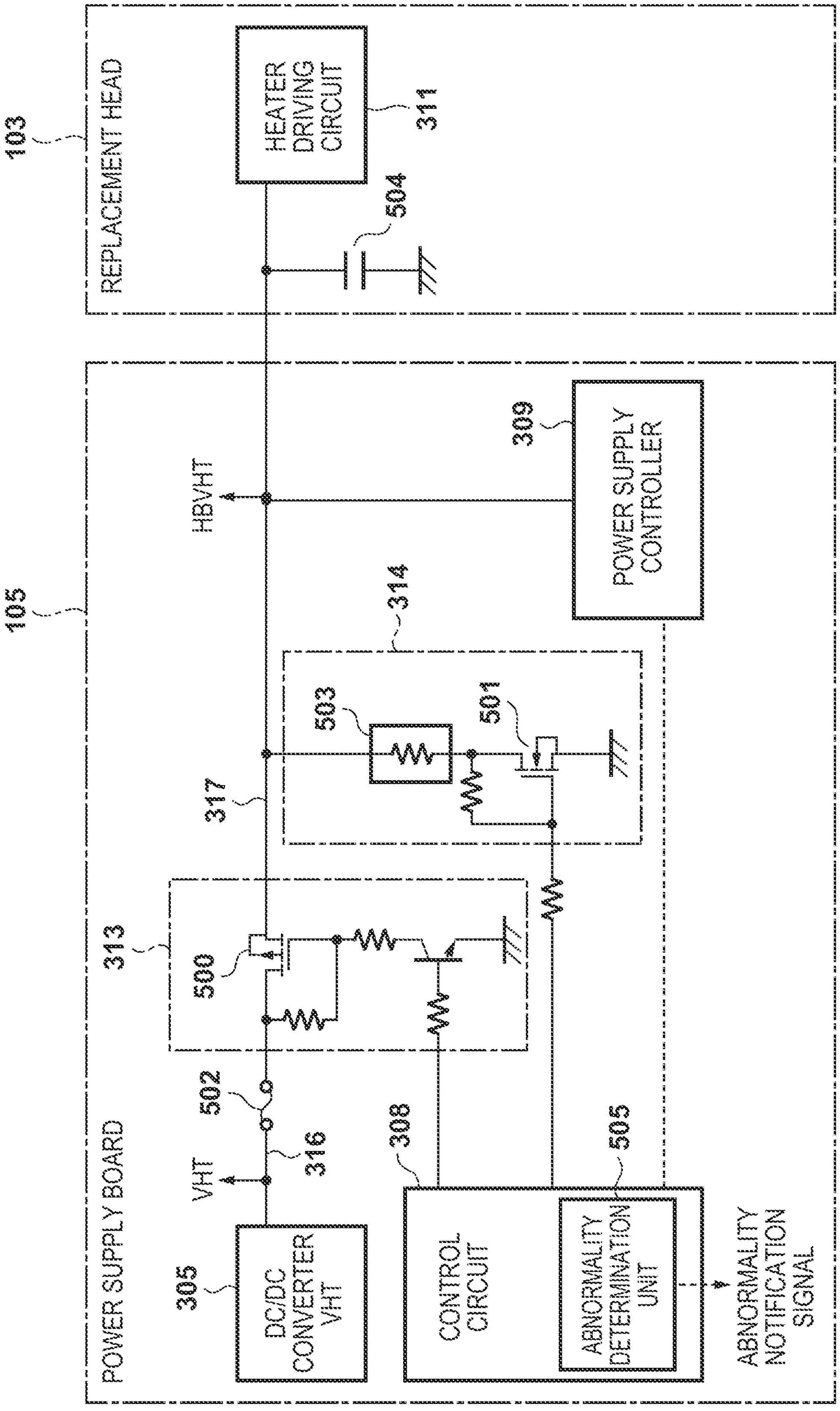
FIG. 5 is a configuration diagram of a power supply board according to the first embodiment.

FIG. 5 is a diagram for explaining the structures of the connection circuit 313 and the electric discharge circuit 314 in the power supply board 105 according to the present embodiment. The output voltage VHT power of the first power supply line 316, which connects the DC/DC converter 305 and the connection circuit 313 is supplied to the second power supply line 317 via a field-effect transistor (FET) 500, which is a switch unit of the connection circuit 313, at the voltage HBVHT. The voltage HBVHT power supplied from the second power supply line 317 is a power for driving the heater, and a capacitive load 504 is connected to the second power supply line 317, which connects the connection circuit 313 and the heater driving circuit 311. In addition the electric discharge circuit 314, which is configured by an FET 501 and a thermistor 503, is connected to the second power supply line 317 and limits the amount of current by converting the electric discharge current into temperature using a thermistor 503, which includes a positive temperature coefficient (PTC) thermistor. The power supply controller 309 communicates with the control circuit 308, monitors the voltage of the second power supply line 317, and transmits the monitored voltage value to the control circuit 308 as voltage monitoring information. The control circuit 308 includes an abnormality determination unit 505, analyzes the voltage monitoring information obtained from the power supply controller, and determines whether at least one of the connection circuit 313 and the electric discharge circuit 314 is abnormal based on the voltage value of the power supply line 317. When the abnormality determination unit 505 determines that there is an abnormality in at least one of the connection circuit 313 and the electric discharge circuit 314, the control circuit 308 decides not to supply power to the second power supply line 317 and outputs an abnormality notification signal to outside of the print head 100. When it is determined that there is no abnormality in the connection circuit 313 and the electric discharge circuit 314, the control circuit 308 decides to supply power to the second power supply line 317. The control circuit 308 can also switch the operation state (on/off) of the connection circuit 313 and the electric discharge circuit 314.

In a first operation mode of the connection circuit 313, current flows from the first power supply line 316 to the second power supply line 317 by the control circuit 308 applying (turning on) a voltage greater than or equal to a gate threshold between the gate and source of the FET 500 of the connection circuit 313. In the second operation mode, the control circuit 308 prevents current from flowing from the first power supply line 316 to the second power supply line 317 by not applying a voltage greater than the gate threshold between the gate and source of the FET 500 of the connection circuit 313.

In the third operation mode, the control circuit 308 reduces the voltage of the power supply line 317 by causing the charge accumulated in the power supply line 317 to flow to the ground via the electric discharge circuit 314 by applying (turning on) a voltage greater than the gate threshold between the gate and source of the FET 501 of the electric discharge circuit 314. In the fourth operation mode, the control circuit 308 prevents the voltage of the power supply line 317 from decreasing by not applying a voltage greater than or equal to the gate threshold between the gate and source of the FET 501.

The control circuit 308 may, for example, perform exclusive control, such as when operating the connection circuit 313 in an on state, operating the electric discharge circuit 314 in an off state. As a result, it is possible to prevent excessive current from flowing from the DC/DC converter 305 to the ground via the connection circuit 313 and the electric discharge circuit 314. A fuse 502, which is provided in the first power supply line 316, is a fuse element for protecting the replacement head 103 by opening the first power supply line 316 when a predetermined amount or more of current flows into the first power supply line 316 such that excessive current does not flow to the replacement head 103.

Figure 4:
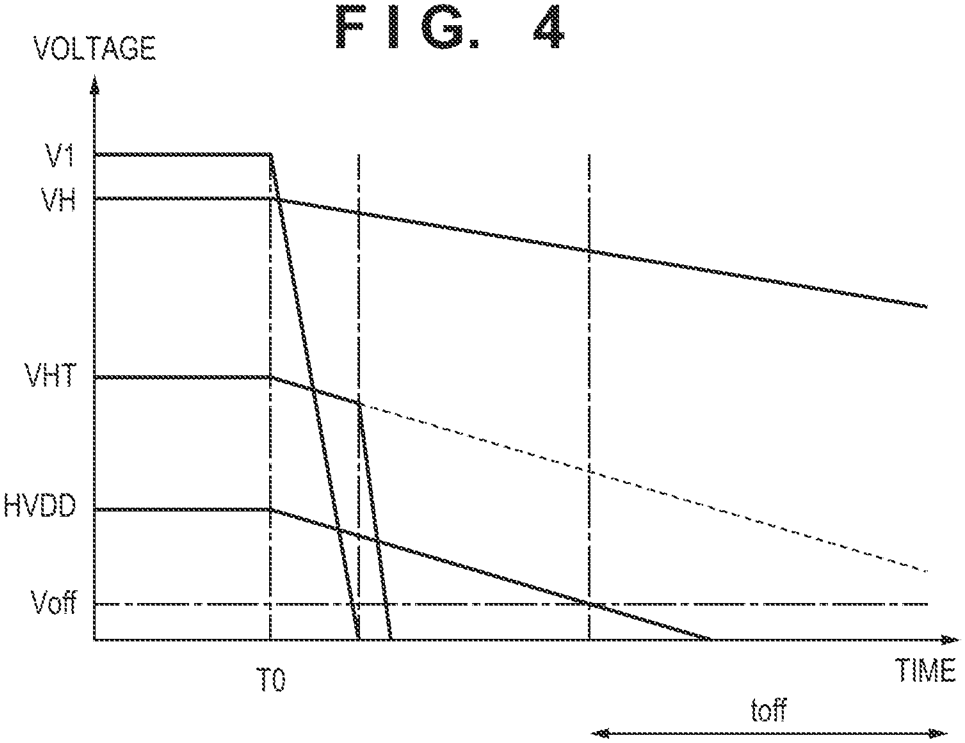
FIG. 4 is a diagram for explaining the operation of an electric discharge circuit according to the first embodiment.

As described in FIGS. 4 and 5, due to a malfunction or the like of semiconductors, which are switch elements of the connection circuit 313 and the electric discharge circuit 314, in the power supply board 105, the power supply board 105 may not function properly. In such a case, current unintendedly flows across the replacement head 103, and the replacement head 103 may be caused to malfunction. By there being malfunction locations in addition to the power supply board 105 in this way, the number of malfunctioning components to be replaced increases and the difficulty of identifying the malfunction locations increases; thus, the cost of repair may increase. Therefore, in the power supply board 105, it is necessary to detect that an abnormality is occurring in at least one of the connection circuit 313 and the electric discharge circuit 314 (at least one of the connection circuit 313 and the electric discharge circuit 314 is malfunctioning) and operate so as not to cause unintended current to flow across the replacement head 103.

A power supply control sequence for detecting a malfunction of the connection circuit 313 and the electric discharge circuit 314 according to the present embodiment will be described with reference to FIGS. 6 and 7. FIG. 6 is a flowchart for explaining an example of processing that is performed in an inspection sequence. FIG. 7 is a diagram for explaining a change in the voltage of the second power supply line 317, which changes according to the processing of the flowchart illustrated in FIG. 6. The respective processing steps of FIG. 7 denote the timings at which the processes referenced by the reference numerals of FIG. 6 are performed.

A reference voltage Vth is a voltage threshold for determining whether the power supply board 105 is normal and is used to perform abnormality determination processing in the abnormality determination unit 505. Part of the determination in the abnormality determination unit 505 is illustrated in the lower part of FIG. 7.

Figure 6:
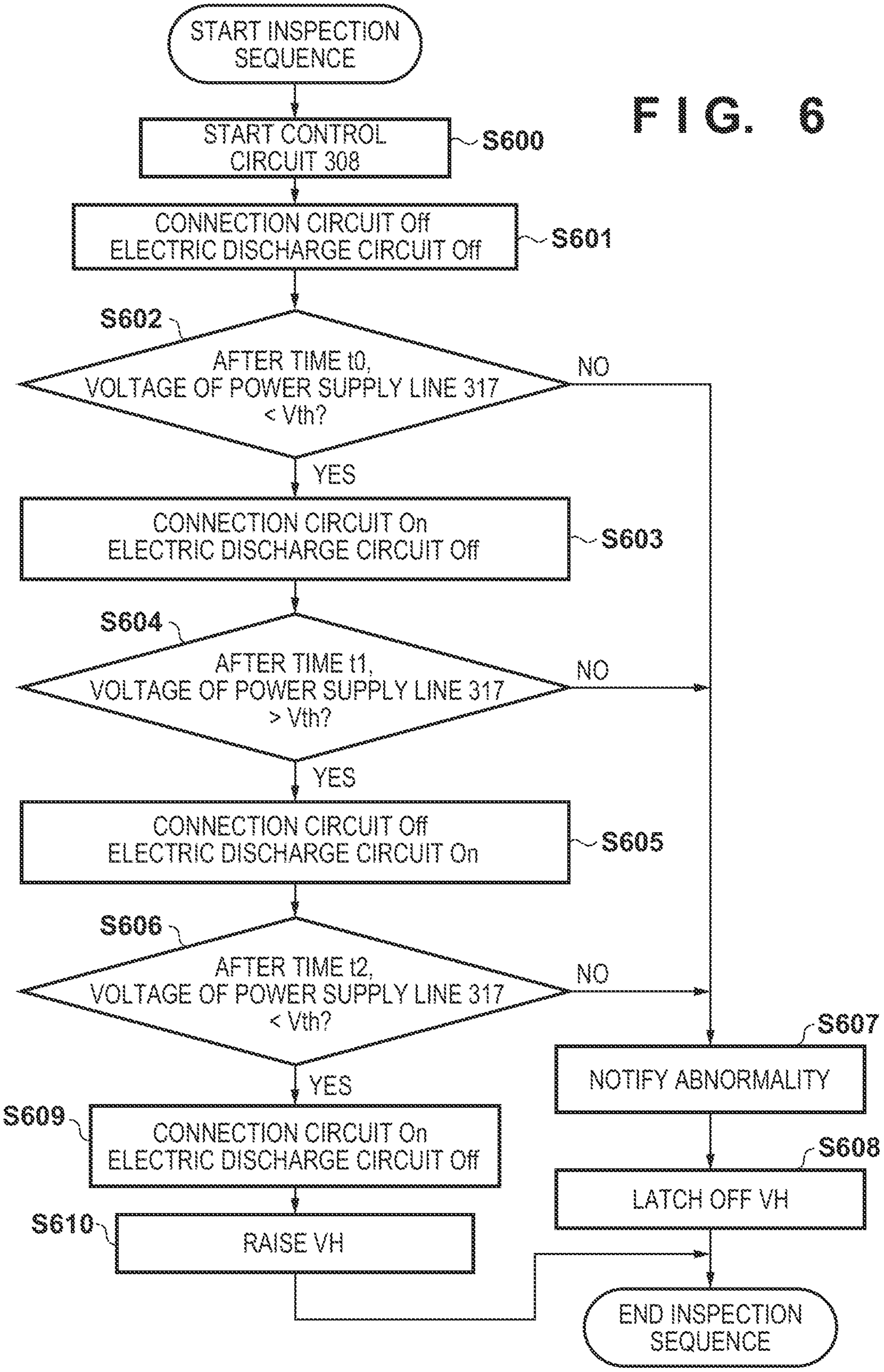
FIG. 6 is a flowchart for explaining an inspection sequence according to the first embodiment.
Figure 7:
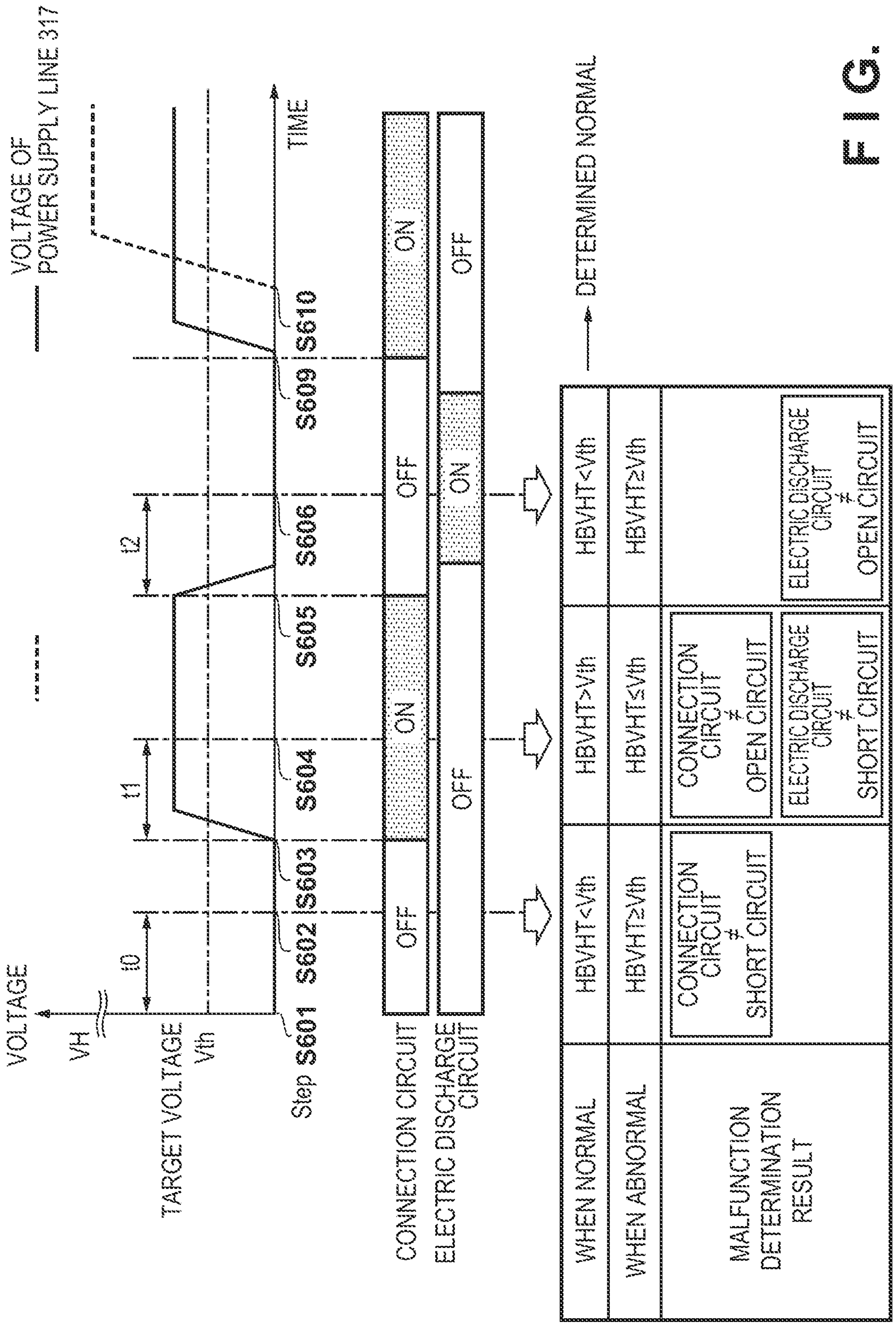
FIG. 7 is a diagram illustrating the operation of a power supply at the time of an inspection sequence according to the first embodiment.

The processing sequence indicated in FIG. 6 is executed by the power supply apparatus 207 in a process for starting the print head 100. In step S600, the control circuit 308 is started by power being supplied from the AC/DC converter 301 to the DC/DC converters 304 and 307 and the voltage V2 power being supplied to the control circuit 308.

In step S601, the control circuit 308 operates the connection circuit 313 and the electric discharge circuit 314 in an off state. That is, the control circuit 308 operates the connection circuit 313 in the second operation mode and operates the electric discharge circuit 314 in the fourth operation mode. Here, based on a condition that, after time t0 has elapsed, the voltage of the power supply line 317 is below a voltage threshold Vth (Yin step S602), the control circuit 308 determines that the operation in a control state in which the connection circuit 313 and the electric discharge circuit 314 are in an off state is normal. Based on a condition that the voltage of the power supply line 317 is greater than or equal to the voltage threshold Vth (N in step S602), the control circuit 308 determines that the connection circuit 313 is short-circuit malfunctioning and advances the processing to step S607.

In step S603, the control circuit 308 sets the connection circuit 313 to be in an on state (first operation mode) and sets the electric discharge circuit 314 to be in an off state (fourth operation mode). Here, if, after time t1 has elapsed, the voltage of the power supply line 317 exceeds a voltage threshold Vth (Y in step S604), the control circuit 308 determines that the operation in a control state in which the connection circuit 313 is in an on state and the electric discharge circuit 314 is in an off state is normal and advances the processing to step S605. Based on a condition that the voltage of the second power supply line 317 is less than or equal to the voltage threshold Vth (N in step S604), the control circuit 308 determines that the connection circuit 313 is in an open-circuit state (open-circuit malfunction) or the electric discharge circuit 314 is in a short-circuit state (short-circuit malfunction) and advances the processing to step S607.

In step S605, the control circuit 308 operates the connection circuit 313 to be in an off state (second operation mode) and operates the electric discharge circuit 314 to be in an on state (third operation mode). Here, if, after time t2 has elapsed, the voltage of the power supply line 317 is below the voltage threshold Vth (Y in step S606), the control circuit 308 determines that the operation in a control state in which the connection circuit 313 is in an off state and the electric discharge circuit 314 is in an on state is normal and advances the processing to step S609. Based on a condition that the voltage of the second power supply line 317 is greater than or equal to the voltage threshold Vth (N in step S606), the control circuit 308 determines that there is a possibility that the electric discharge circuit 314 is open-circuit malfunctioning in which it is in an open-circuit state and is unable to perform electric discharge and advances the processing to step S607.

In step S607, the control circuit 308 transmits an abnormality notification signal for notifying that an abnormality has occurred in at least one of the connection circuit 313 and the electric discharge circuit 314. For example, the abnormality determination unit 505 may notify the user that an abnormality has occurred via an output interface (not illustrated), such as a display or a light emitting diode (LED) included in the printing apparatus 1. In one example, the control circuit 308 may transmit an abnormality notification signal that includes a type indicating what abnormality has occurred. For example, when it is determined in step S602 that the voltage of the second power supply line 317 is greater than or equal to the voltage threshold, the control circuit 308 may control an abnormality notification signal so as to display, on a display (not illustrated) of the printing apparatus 1, a message that includes information indicating the possibility of a short-circuit malfunction of the connection circuit 313. Similarly, when the voltage of the power supply line 317 is less than or equal to the voltage threshold in step S604, an abnormality notification signal may be controlled so as to display, on the display (not illustrated) of the printing apparatus 1, a message that includes information indicating the possibility of an open-circuit malfunction of the connection circuit 313 or a short-circuit malfunction of the electric discharge circuit 314. Similarly, when it is determined in step S606 that the voltage of the second power supply line 317 is greater than or equal to the voltage threshold, an abnormality notification signal may be controlled so as to display, on a display (not illustrated) of the printing apparatus 1, a message that includes information indicating the possibility of an open-circuit malfunction of the electric discharge circuit 314. Alternatively, a different LED may be lit depending on the type of abnormality that may have occurred.

In step S608, even if the voltage of the first power supply line 316 for supplying the voltage VHT and the voltage of the power supply line for supplying the voltage HVDD are raised, the control circuit 308 does not supply the voltage VH to the heater 312 and performs an abnormal termination via the power supply controller 309. For example, in step S608, the power supply controller 309 may be controlled so as not to supply power from the DC/DC converter 303 to the heater 312. The control circuit 308 may execute a control operation such that the connection circuit 313 operates in an off state (second operation mode) and the electric discharge circuit 314 operates in an on state (third operation mode) regardless of the possibility of malfunction. That is, in step S608, by not supplying power to at least one of the heater 312 and the heater driving circuit 311, inappropriate supply of power to the replacement head 103 and malfunction of the replacement head 103 are prevented.

The control circuit 308 sets, in step S609, the connection circuit 313 to be in an on state and the electric discharge circuit 314 to be in an off state; raises, in step S610, the voltage of the power supply line 318 for supplying the voltage VH; and then performs a normal termination of the inspection sequence illustrated in FIG. 6. When switching the on/off states of the connection circuit 313 and the electric discharge circuit 314, the switch may be executed while providing a period in which both the connection circuit 313 and the electric discharge circuit 314 operate in an off state as illustrated in FIG. 7. As a result, due to the difference in the control timings, the power transmission by the connection circuit 313 and electric discharge by the electric discharge circuit 314 are performed at the same time, and it is possible to prevent excessive current from flowing.

As described above, the control circuit 308 according to the present embodiment determines whether at least one of the connection circuit 313 and the electric discharge circuit 314 is malfunctioning based on a control state of the connection circuit 313 and the electric discharge circuit 314 and the voltage of the power supply line to which the electric discharge circuit 314 is connected. Then, when it is determined that either is malfunctioning (an abnormality has occurred), the control circuit 308 decides not to supply power to the print head 100. As a result, even if a circuit malfunction is occurring, the operation of the printing apparatus 1 can be stopped without inducing a malfunction of the print head 100. As a result, it is possible to restore the printing apparatus 1 simply by replacing the power supply board 105 or the power supply apparatus 207; thus, it is possible to reduce the number of malfunction locations and reduce the hassle and the cost of repair.

Second Embodiment

In the present embodiment, a configuration in which, in the power supply board of the first embodiment, a circuit for performing electric replay from another power supply is further connected to the power supply line for supplying the voltage HBVHT will be described. The same reference numerals will be used for configurations, functions, and processes that are similar to the first embodiment, and descriptions thereof will be omitted.

Figure 8:
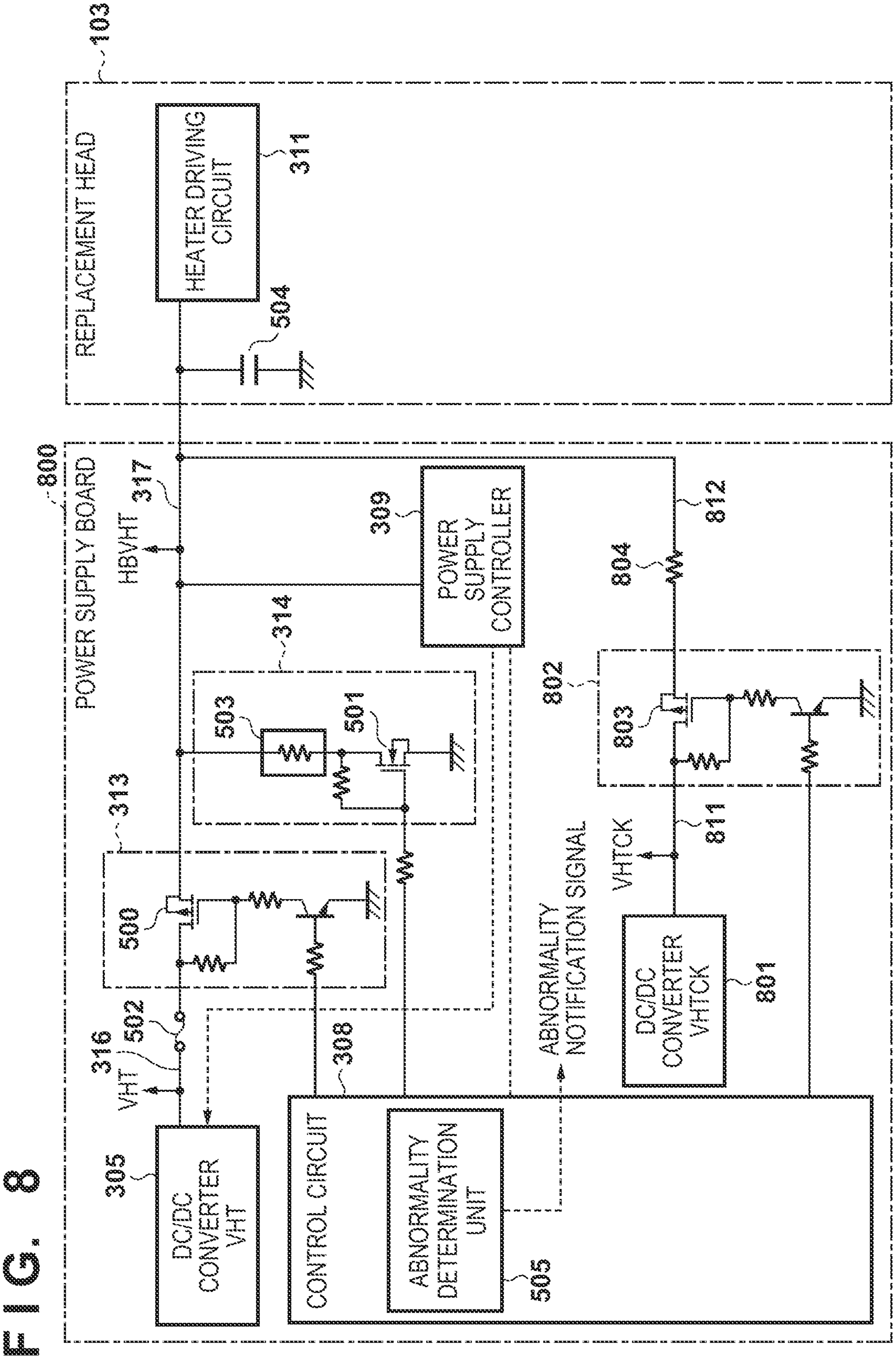
FIG. 8 is a configuration diagram of the power supply board according to a second embodiment.

A power supply board 800 according to the present embodiment will be described with reference to FIG. 8. The power supply board 800 according to the present embodiment includes a DC/DC converter 801, and a power supply line (fourth power supply line) 811 for supplying a voltage VHTCK is connected to the DC/DC converter 801. A power supply line (fifth power supply line) 812, which includes a current limiting resistor 804, is connected to the fourth power supply line 811 via a connection circuit 802, which is configured by an FET 803 and the like, and the fifth power supply line 812 is connected to the second power supply line 317. The connection circuit 802, which relays the voltage VHTCK power supplied by the DC/DC converter 801, is a short-circuit check circuit (short-circuit CHK circuit) provided for confirming a short circuit in the replacement head 103. The connection circuit 802 is configured similarly to the connection circuit 313 and controlled by the control circuit 308, and on/off of the connection operation can be switched. In the following description, a mode in which the connection circuit 802 makes a connection so as to transmit the power supplied from the DC/DC converter 801 to the fifth power supply line 812 is set as a first operation mode (on state), and a mode in which power is not transmitted is set as a second operation mode (off state). By limiting current by operating the connection circuit 313 in an off state and operating the connection circuit 802 in an on state so as not to cause the replacement head 103 to malfunction at the time of inspection and by monitoring the voltage, it is possible to confirm a short circuit in the replacement head 103. The present embodiment describes an inspection sequence for distinguishing a malfunction of the connection circuit 802 and a malfunction of the connection circuit 313 and the electric discharge circuit 314, which are inspected in the first embodiment.

Figure 9A:
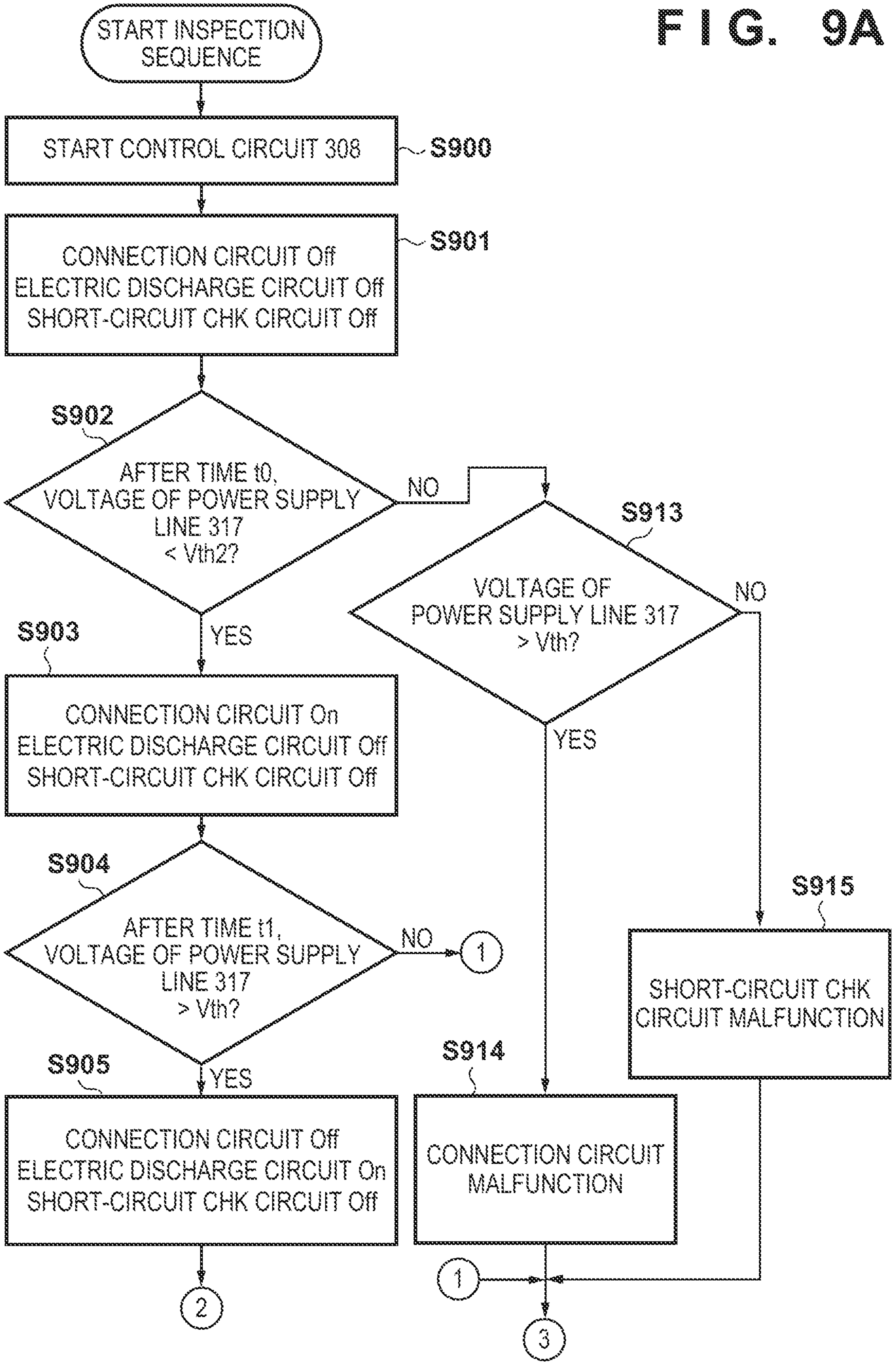
FIGS. 9A and 9B are flowcharts for explaining an inspection sequence according to the second embodiment.
Figure 9B:
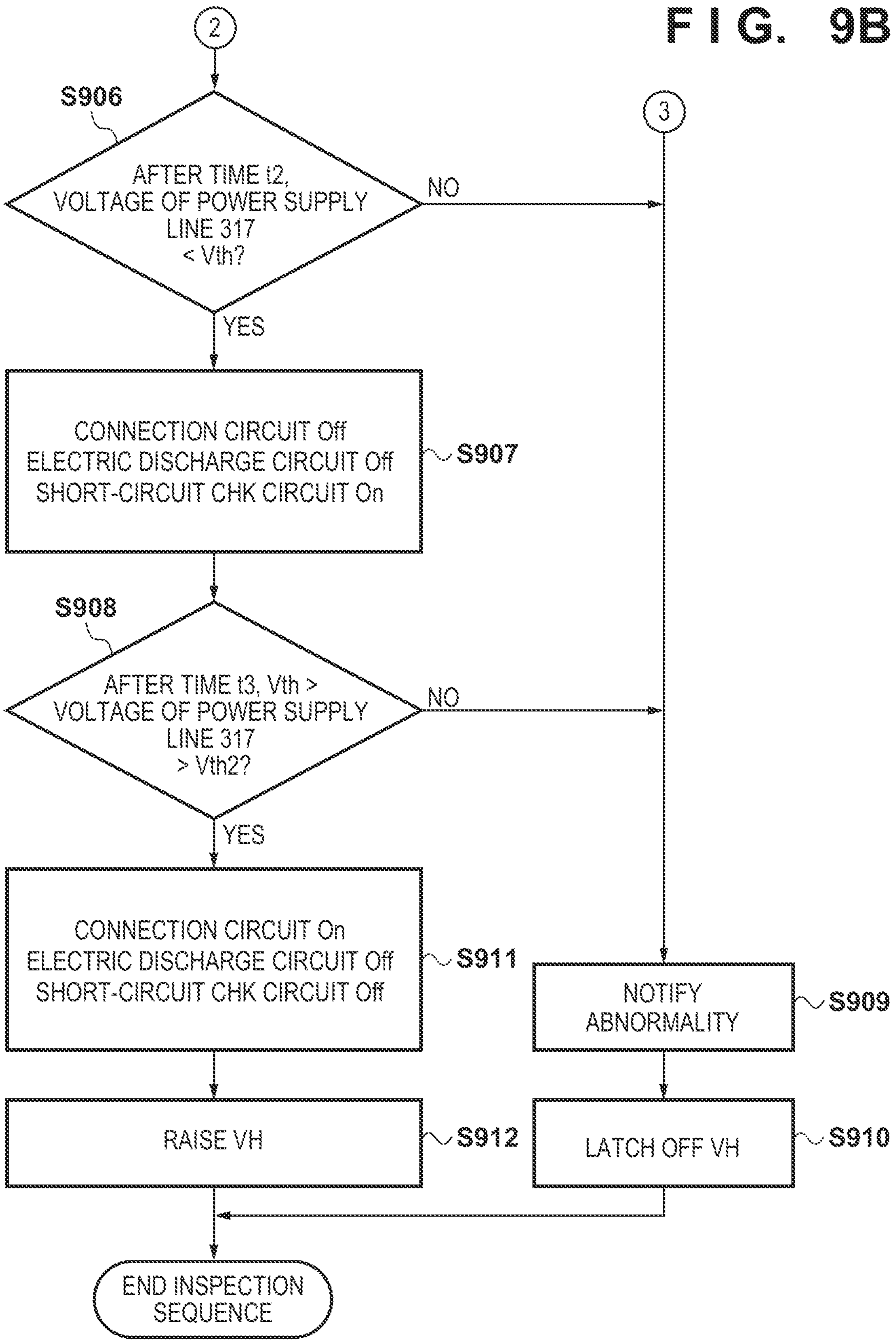
Figure 10:
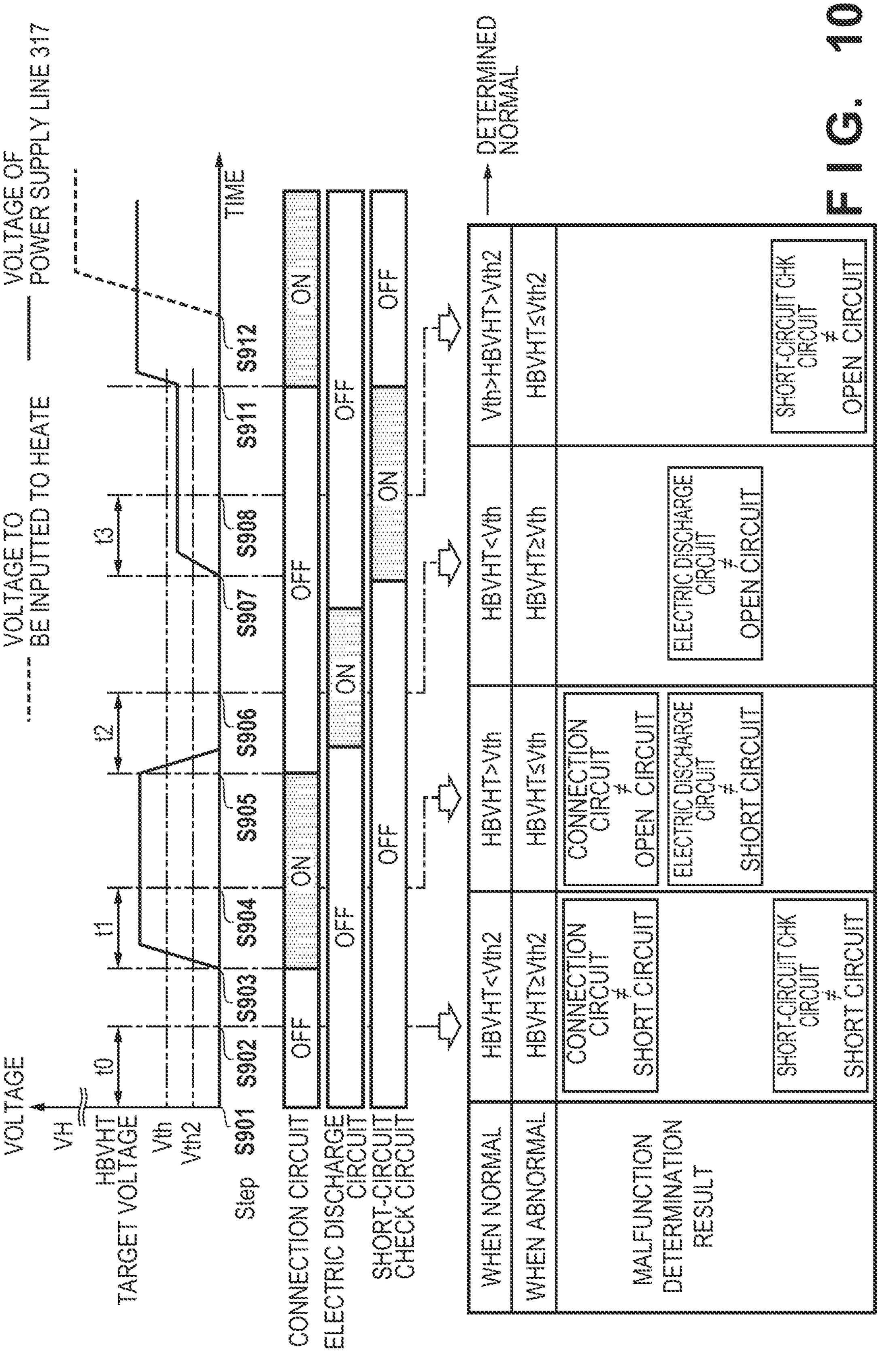
FIG. 10 is a diagram illustrating the operation of the power supply at the time of an inspection sequence according to the second embodiment.

A power supply control sequence according to the present embodiment will be described with reference to FIGS. 9A, 9B, and 10. FIGS. 9A and 9B are flowcharts for explaining a power supply control method of performing inspection for determining whether the operation of the power supply apparatus 207 according to the present embodiment is abnormal and controlling power supply. FIG. 10 is a diagram illustrating a change in the voltage of the second power supply line 317 for supplying the voltage HBVHT according to the flowchart of FIGS. 9A and 9B. In the present embodiment, by setting the voltage value of the short-circuit check circuit to be different from the voltage HBVHT and comparing the voltage value with a voltage threshold Vth2 for abnormal determination, it is determined whether the short-circuit check circuit is abnormal. According to this, it is possible to distinguish between a malfunction of the connection circuit 313 and a malfunction of the connection circuit 802 at the time of malfunction determination.

In step S901, the control circuit 308 operates the connection circuit 313, the electric discharge circuit 314, and the connection circuit 802 in an off state. In step S902, the control circuit 308 determines whether, when time t0 has elapsed, the voltage of the power supply line 317 is less than the second voltage threshold Vth2. If it is determined that the voltage of the power supply line 317 is less than the second voltage threshold Vth2 (Yin step S902), the control circuit 308 determines that the operation in an off state is normal for the connection circuit 313, the electric discharge circuit 314, and the connection circuit 802 and advances the processing to step S903. If it is determined that the voltage of the power supply line 317 is greater than or equal to the second voltage threshold Vth2 (N in step S902), the control circuit 308 determines that the connection circuit 313 or 802 is short-circuit malfunctioning and advances the processing to step S913.

In step S913, the control circuit 308 determines whether the voltage of the second power supply line 317 is greater than the first voltage threshold Vth. If it is determined that the voltage of the second power supply line 317 is greater than the first voltage threshold Vth (Y in step S913), the control circuit 308 determines that the connection circuit 313 is short-circuit malfunctioning (step S914). If it is determined that the voltage of the second power supply line 317 is less than or equal to the first voltage threshold Vth (N in step S913), the control circuit 308 determines that the connection circuit 802 is short-circuit malfunctioning (step S915).

The processing of step S903 to step S906 is similar to that of step S603 to step S606 of FIG. 6 except that the connection circuit 802 operates in an off state; thus, description will be omitted.

In step S907, the control circuit 308 operates the connection circuit 313 and the electric discharge circuit 314 in an off state and the connection circuit 802 in an on state. In step S908, the control circuit 308 determines whether, when time t3 has elapsed, the voltage of the power supply line 317 is greater than the second voltage threshold Vth2 and less than the first voltage threshold Vth. If it is determined that the voltage of the power supply line 317 is higher than the second voltage threshold Vth2 and lower than the first voltage threshold Vth (Y in step S908), the control circuit 308 determines that the operation in which the connection circuit 313 and the electric discharge circuit 314 are in an off state and of the connection circuit 802 is in the on state is normal. If it is determined that the voltage of the second power supply line 317 is less than or equal to the second voltage threshold Vth2 or greater than or equal to the first voltage threshold (N in step S908), the control circuit 308 determines that the connection circuit 802 is open-circuit malfunctioning and advances the processing to step S909.

In step S911, the control circuit 308 starts the connection circuit 313 in an on state and the electric discharge circuit 314 and the connection circuit 802 in an off state and supplies power from the second power supply line 317 to the heater driving circuit 311. Then, in step S912, the control circuit 308 raises the voltage of the third power supply line 318 and supplies power to the heater 312. Steps S909 and S910 are similar to steps S607 and S608 of FIG. 6; thus, description will be omitted.

As described above, in the present embodiment, a condition for when the short-circuit check circuit is to be on/off is added to the first embodiment, and in step S907, only the connection circuit 802, which is the short-circuit check circuit, is turned on. Then, in step S908, based on a condition that Vth>the voltage of the second power supply line 317>Vth2, it is determined that the connection circuits 313 and 802 and the electric discharge circuit 314 are normal. Then, when it is determined that the connection circuits 313 and 802 and the electric discharge circuit 314 are normal, the control circuit 308 decides to supply power to the heater driving circuit 311 and the heater 312. In addition, when it is determined that at least one of the connection circuits 313 and 802 and the electric discharge circuit 314 is abnormal, the control circuit 308 performs control so as not to supply power to the heater 312. Alternatively, when it is determined that at least one of the connection circuits 313 and 802 and the electric discharge circuit 314 is abnormal, the control circuit 308 performs control so as not to supply power to the heater driving circuit 311.

As described above, even if there are a plurality of connection circuits for supplying power to an external apparatus, the printing apparatus 1 according to the present embodiment can detect a malfunction. In addition, it is possible to identify the malfunction location by making the voltages of supplied power different.

OTHER EMBODIMENTS

Regarding the processing of steps S601, S603 and S605 indicated in FIG. 6 and steps S901, S903, S905 and S907 indicated in FIGS. 9A and 9B, their order can be changed arbitrarily.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-127323, filed Aug. 9, 2022 hereby incorporated by reference herein in its entirety.

What is claimed is:

1. A power supply apparatus comprising:

a first power supply line to which power is supplied from a power supply unit;

a second power supply line connected to an external apparatus;

a connection unit connecting the first power supply line and the second power supply line and configured to be capable of operating in either a first operation mode in which power transmission from the first power supply line to the second power supply line is possible or a second operation mode in which power transmission is not possible;

an electric discharge unit connected to the second power supply line and configured to be capable of operating in either a third operation mode in which a voltage of the second power supply line is dropped or a fourth operation mode in which the voltage is not dropped;

a voltage monitoring unit configured to monitor the voltage of the second power supply line; and a control unit configured to control operation of the connection unit and the electric discharge unit, wherein the control unit decides whether to supply power to the second power supply line based on a control state of the connection unit and the electric discharge unit and the voltage of the second power supply line monitored by the voltage monitoring unit.

2. The power supply apparatus according to claim 1, wherein in a case where the control unit controls the connection unit to operate in the second operation mode and the electric discharge unit to operate in the fourth operation mode, the control unit does not supply power to the second power supply line based on a condition that the voltage of the second power supply line is greater than or equal to a threshold.

3. The power supply apparatus according to claim 1, wherein in a case where the control unit controls the connection unit to operate in the first operation mode and controls the electric discharge unit to operate in the fourth operation mode, the control unit does not supply power to the second power supply line based on a condition that the voltage of the second power supply line is less than or equal to a threshold.

4. The power supply apparatus according to claim 3, wherein in a case where a first time has elapsed after switching operation of the connection unit to the first operation mode and switching operation of the electric discharge unit to the fourth operation mode, the control unit does not supply power to the second power supply line based on a condition that the voltage of the second power supply line is less than or equal to the threshold.

5. The power supply apparatus according to claim 1, wherein in a case where the control unit controls the connection unit to operate in the second operation mode and the electric discharge unit to operate in the third operation mode, the control unit does not supply power to the second power supply line based on a condition that the voltage of the second power supply line is greater than or equal to a threshold.

6. The power supply apparatus according to claim 5, wherein in a case where a second time has elapsed after switching operation of the connection unit to the second operation mode and switching operation of the electric discharge unit to the third operation mode, the control unit does not supply power to the second power supply line based on a condition that the voltage of the second power supply line is greater than or equal to the threshold.

7. The power supply apparatus according to claim 1, wherein in a case where the control unit controls the connection unit to operate in the second operation mode and the electric discharge unit to operate in the fourth operation mode, the control unit supplies power to the second power supply line based on a condition that the voltage of the second power supply line is less than a threshold.

8. The power supply apparatus according to claim 1, wherein in a case where the control unit controls the connection unit to operate in the first operation mode and the electric discharge unit to operate in the fourth operation mode, the control unit supplies power to the second power supply line based on a condition that the voltage of the second power supply line is greater than a threshold.

9. The power supply apparatus according to claim 8, wherein in a case where a first time has elapsed after switching operation of the connection unit to the first operation mode and switching operation of the electric discharge unit to the fourth operation mode, the control unit supplies power to the second power supply line based on a condition that the voltage of the second power supply line is greater than the threshold.

10. The power supply apparatus according to claim 1, wherein in a case where the control unit controls the connection unit to operate in the second operation mode and the electric discharge unit to operate in the third operation mode, the control unit supplies power to the second power supply line based on a condition that the voltage of the second power supply line is less than a threshold.

11. The power supply apparatus according to claim 10, wherein in a case where a second time has elapsed after switching operation of the connection unit to the second operation mode and switching operation of the electric discharge unit to the third operation mode, the control unit supplies power to the second power supply line based on a condition that the voltage of the second power supply line is less than the threshold.

12. The power supply apparatus according to claim 1, further comprising: a notification unit configured to, in a case where the control unit decides not to supply power to the second power supply line, notifies an abnormality.

13. The power supply apparatus according to claim 1, wherein the control unit controls operation of the connection unit and the electric discharge unit such that, while the connection unit is operating in the first operation mode, the electric discharge unit does not operate in the third operation mode.

14. The power supply apparatus according to claim 1, wherein the external apparatus includes a heater configured to discharge ink using heat and a heater driving circuit configured to drive the heater, and the second power supply line supplies power to the heater driving circuit.

15. The power supply apparatus according to claim 14, further comprising:

a third power supply line configured to supply power to the heater, wherein in a case where the control unit decides not to supply power to the second power supply line, the control unit performs control so as to stop supply of power from the third power supply line to the heater.

16. The power supply apparatus according to claim 1, wherein the first power supply line includes a fuse element configured to provide protection such that current that is greater than or equal to a predetermined amount does not flow to the second power supply line.

17. An image forming apparatus comprising:

the power supply apparatus according to claim 1, wherein the external apparatus is a head including a heater configured to discharge ink using heat and a heater driving circuit configured to drive the heater, wherein the second power supply line supplies power to the heater driving circuit, and wherein the head forms an image on a printing medium by discharging ink using heat.

18. The image forming apparatus according to claim 17, wherein the power supply apparatus further comprises a third power supply line configured to supply power to the heater, and wherein in a case where the control unit decides not to supply power to the second power supply line, the control unit performs control so as to stop supply of power from the third power supply line to the heater.

19. A power supply control method executed by a power supply apparatus, the apparatus comprising:

a first power supply line to which power is supplied from a power supply unit;

a second power supply line connected to an external apparatus;

a connection unit connecting the first power supply line and the second power supply line and configured to be capable of operating in either a first operation mode in which power transmission from the first power supply line to the second power supply line is possible or a second operation mode in which power transmission is not possible;

an electric discharge unit connected to the second power supply line and configured to be capable of operating in either a third operation mode in which a voltage of the second power supply line is dropped or a fourth operation mode in which the voltage is not dropped;

a voltage monitoring unit configured to monitor the voltage of the second power supply line; and a control unit configured to control operation of the connection unit and the electric discharge unit, and the method comprising:

deciding whether to supply power to the second power supply line based on a control state of the connection unit and the electric discharge unit according to the control unit and the voltage of the second power supply line monitored by the voltage monitoring unit.

* * * * *